United States Patent Office 2,924,844
Patented Feb. 16, 1960

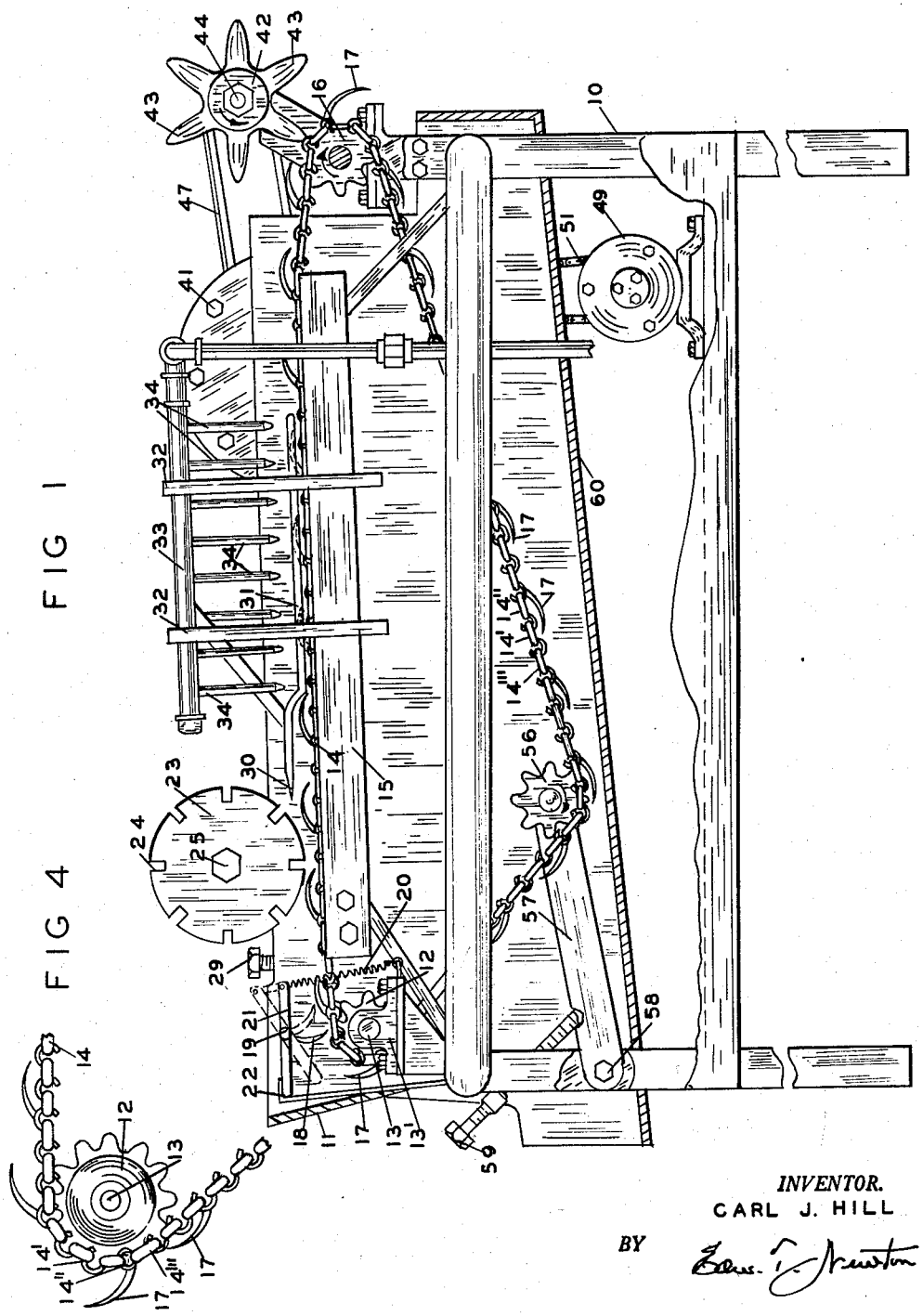

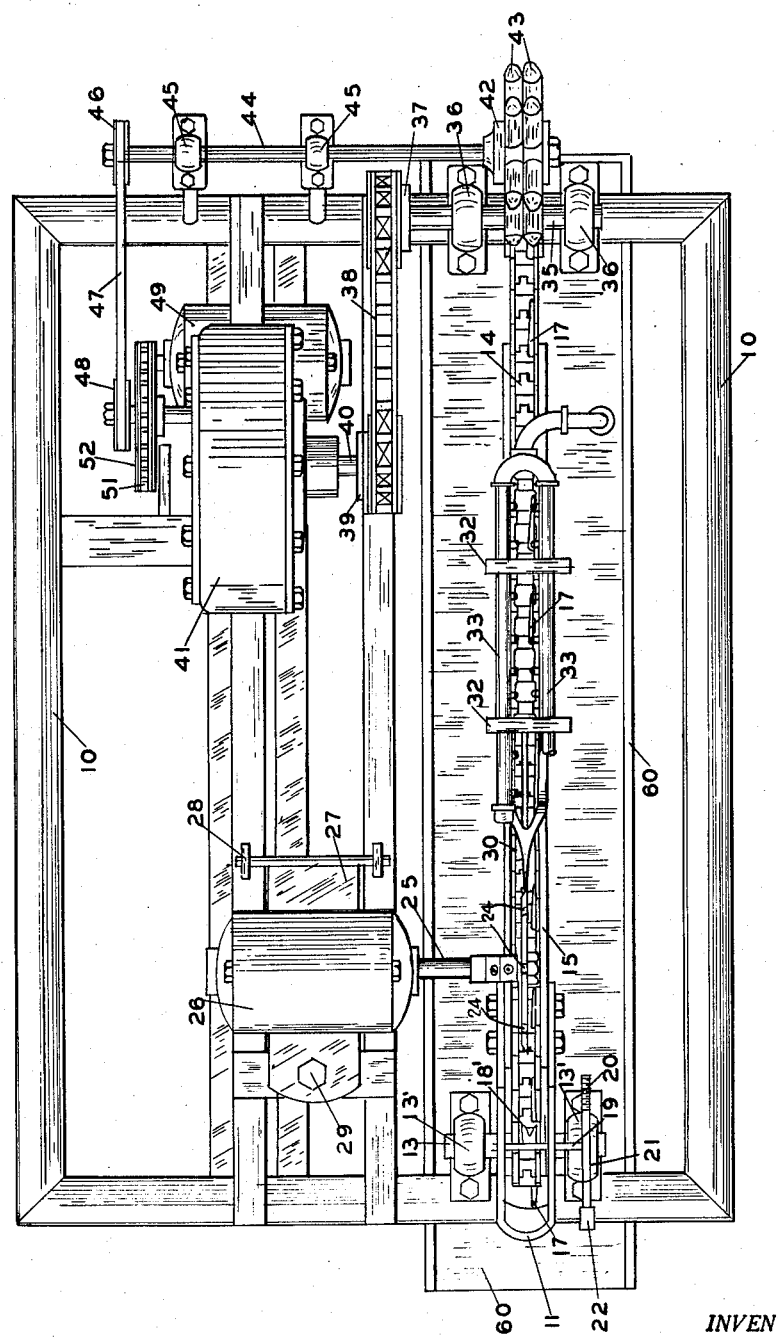

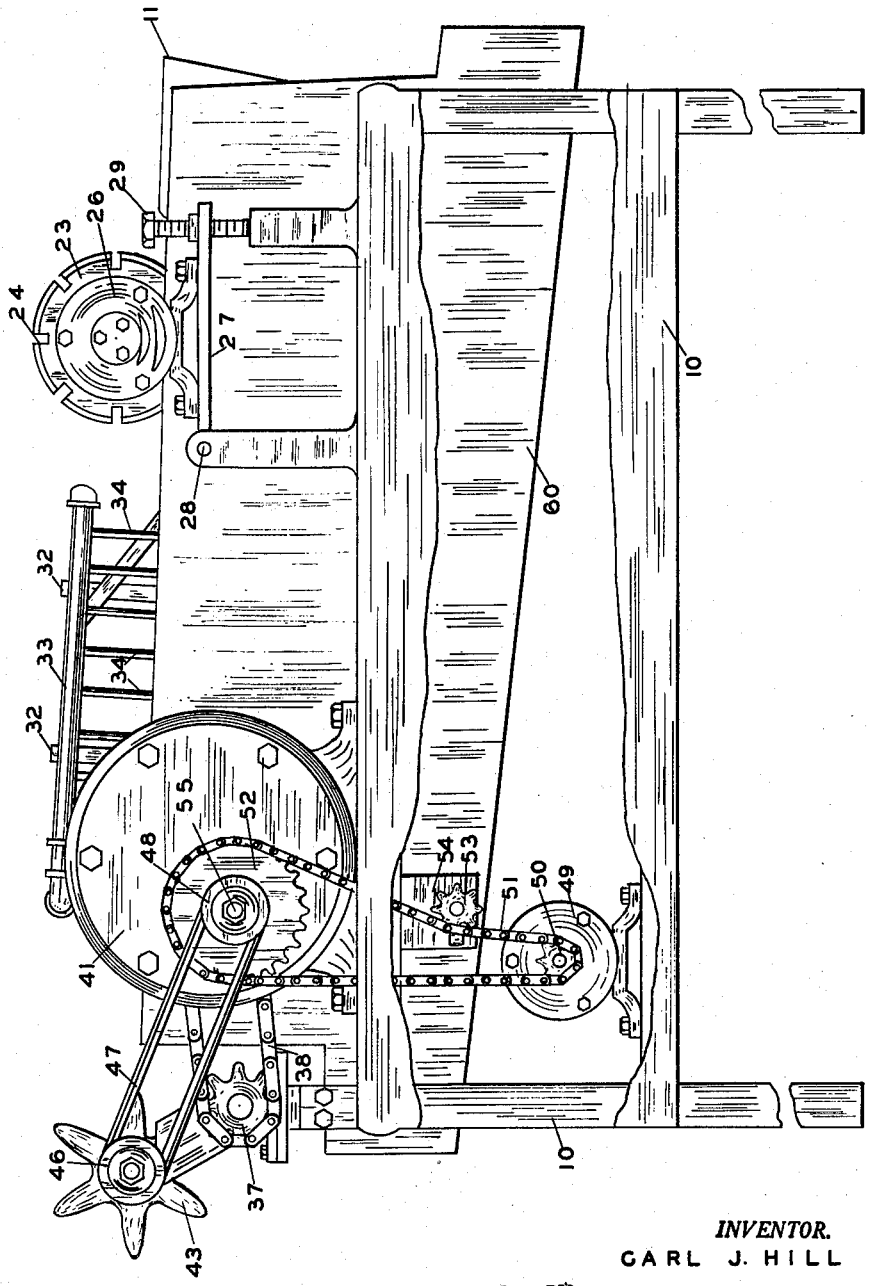

2,924,844
GIZZARD CLEANING MACHINE
Carl J. Hill, Canton, Ga.

Application May 13, 1954, Serial No. 429,607

3 Claims. (Cl. 17—11)

The present invention relates to the poultry processing industry, and specifically to a gizzard cleaning machine.

It has been the practice heretofore to clean gizzards by hand, the procedure being to cut partially through the muscular portion of the gizzard, then pry the gizzard apart with the thumbs to expose the interior sack, which is removed and discarded. This hand method is laborious and slow, requiring many employees to perform this operation compared with the number required for other operations in the plant.

While attempts have been made to use machinery for cleaning gizzards, such machines have not been widely accepted as their operation is unreliable. It is desirable not only to have the gizzards clean as they are delivered from the machine, but also to have the gizzards cut as accurately as they are in manual cleaning so as to present an attractive appearance when placed on the market.

One object of my invention therefore is to provide a machine to perform the work of several employees in connection with cleaning gizzards in a poultry processing plant.

A further object of my invention is to provide a machine that will thoroughly clean gizzards and prepare them for further processing without requiring any labor other than supplying the gizzards to the machine.

A further object of my invention is to provide a machine that will accurately and quickly split, open, remove the contents, and wash gizzards as a continuous operation dependent solely on the supply of gizzards.

A further object is to provide a method of opening and cleaning gizzards that will greatly accelerate the process of cleaning.

Other and further objects and advantages of my invention will become apparent to those skilled in the art from the following description taken in conjunction with the accompanying drawings in which like characters of reference designate corresponding parts in the several views, and wherein:

Fig. 1 is an elevation, partly broken away, of one side of the machine of my invention.

Fig. 2 is a top plan view of the machine shown in Fig. 1.

Fig. 3 is an elevation of the opposite side of the machine shown in Fig. 1.

Fig. 4 is a fragmentary detail showing the conveyor chain and sprocket.

Referring now to the drawings, the machine is supported by a table or frame 10. In order to present the gizzards one at a time, a chute 11 is provided at the left-hand end of the machine in Fig. 1. This chute is just wide enough to permit a gizzard to pass therethrough on edge.

At the lower end of chute 11 is a sprocket 12 on shaft 13 supported by appropriate pillow blocks 13' on frame 10. A conveyor chain 14 made up of links 14', 14" and 14''' passes over sprocket 12 and thence along the length of the machine supported by a channel element 15 to a second sprocket 16 at the other end of the machine. This sprocket 16 is driven by means to be described later.

On the forward end of every third link of the conveyor chain 14, there is mounted a spear 17 projecting forward in a curve from the link on which it is mounted, and which is located a little to one side of the longitudinal center of the link.

Located in the chute 11 just above sprocket 12, over which conveyor chain 14 with spear 17 passes, is a depending finger 18 secured to a rock shaft 19 sufficiently high above chain 14 that a gizzard can pass therebelow. Finger 18 extends down below the points of spear 17 into close proximity to chain 14. Rock shaft 19 is located so that each gizzard fed by chute 11 falls between finger 18 and an approaching spear 17.

Finger 18 is held in a normal vertical position by a spring 20 attached to one end of a lever 21 that is also secured to rock shaft 19. Adjacent the opposite end of lever 21 is a stop means 22 which is releasable for purposes of cleaning. Spring 20 will permit finger 18 to swing upwardly, as required by operation of the machine, to permit a gizzard to pass beneath the lower bifurcated end 18' on finger 18.

Centered over the conveyor chain adjacent the leading end of channel 15 is a knife means 23, shown here as a rotating sharp metal disc blade with peripheral notches 24 in the edge. Knife 23 is mounted directly on the shaft 25 of an electric motor 26 which is mounted on a table 27 pivoted at 28 for vertical adjustment by means of screw element 29.

From Fig. 2 it will be seen that spears 17 pass to one side of knife 23. Immediately following knife 23 and positioned over channel 15 is a spreading means or plow 30 which curves downwardly and is divided into two hold-down rails 31 supported by the lower portion of uprights 32. Rails 31 are spaced slightly outwardly from chain 14 and extending for a substantial distance along channel 15. Also supported by supports 32 over channel 15 and hold-down rails 31 are water supply pipes 33 from which depend a plurality of nozzles 34 which are so mounted that water discharged therefrom is directed against the space between hold-down rails 31.

From the end of hold-down rails 31, the conveyor chain moves along channel 15 to sprocket 16 at the discharge end of the machine. Sprocket 16 is keyed or otherwise secured to shaft 35 which is rotatably supported by pillow blocks 36 on frame 10. A driving sprocket 37 is keyed to shaft 35. Sprocket 37 is driven by chain 38 and sprocket 39 is keyed to shaft 40 of speed reducer 41.

Mounted over and just a little beyond sprocket 16 are a pair of kick-off wheels 42. Kick-off wheels 42 may be made of rubber and are provided with a plurality of somewhat stiff but flexible fingers 43 that, when rotated rapidly, counterclockwise as shown in Fig. 1, will pass on each side of spears 17 and will clear chain 14 with a minimum of clearance. Kick-off wheels 42 are secured on a shaft 44 supported on pillow blocks or bearings 45 mounted on frame 10. Shaft 44 is driven by a V-pulley 46 which is driven by V-belt 47 from a second V-pulley 48.

A motor 49 carries a sprocket 50 over which passes chain 51 to drive sprocket 52. Tension in this chain 51 is adjusted by means of an idler sprocket 53 mounted on an adjustable plate 54, as seen in Fig. 3.

Sprocket 52 is keyed to a shaft 55 which is the input shaft for the speed reducer 41 which drives sprocket 16. V-pulley 48 which drives kick-off wheels 42 is also secured to this shaft, so it is seen that both the conveyor chain 14 and kick-off wheels 42 are driven from the motor 49. Since chain 14 is driven through reduction gear means 41, and the kicker wheels are driven more directly, it is apparent that the kick-off wheels are driven at a higher speed than is the conveyor chain.

Returning now to the conveyor chain 14 which passes over sprocket 16 at the discharge end of the machine, chain 14 follows around sprocket 16 and under the length of the machine where there is provided an idler 56 mounted on an arm 57 pivoted to frame 10 by a pivot bolt 58. Adjustment of the tension in chain 14 is made by screw means 59 bearing on arm 57.

Under the portion of the machine in which the gizzards are processed; that is, chute 11, conveyor chain 14 and channel 15, is a trough 60 to catch the water used in cleaning the gizzards and to discharge from the machine the material cleaned out of the gizzards. The sides of trough 60 should be high enough to prevent the motors and gears from being splashed.

The machine operates as follows: As a gizzard is placed in the chute (Fig. 1), it will fall edgewise between finger 18 and the curved end of the chute until stopped by hitting chain 14 or the upper end of a spear 17. Finger 18 prevents the gizzard from following chain 14 until a spear 17 has impaled it. From Fig. 4, it will be seen that chain 14 advancing from below toward sprocket 12 is substantially straight and the points of spears 17 lie fairly close to the chain in advance of the link on which the spear is mounted. As the chain curves around sprocket 12, link 14′ first assumes an angle to link 14″ dictated by the size of the sprocket. Then link 14″ assumes the same angle to link 14‴ on which the spear is mounted. As the spear 17 enters the lower portion of chute 11, it will therefore have its point elevated from links 14′ and 14″ and the point of spear 17 will strike the edge of the gizzard at the bottom of the chute.

Finger 18 (Fig. 1) still is urged by spring 20 to resist passage of the gizzard so considerable pressure is exerted to force the point of spear 17 into the gizzard until finally the spear is completely embedded and spring 20 permits finger 18 to swing up and allow the gizzard to pass, and it is clamped in place when the chain straightens out after passing around sprocket 12.

As the gizzard is carried forward on chain 14 it is supported under knife 23 by chain 14 riding in channel 15. Knife 23 is adjusted to cut the gizzard at least half through and the cut is centered so as to result in a product of neat appearance. The cut extends into the contents of the gizzard which includes gravel and sand which is detrimental to the ordinary cutting blade. Notches 24 have been found in practice to materially lengthen the service life of the blade.

Plow element 30 is aligned with knife blade 23 so the point of the plow enters the cut. The plow 30 is curved downwardly so that as the gizzard is progressed along plow 30, the sides of the gizzard are forced outwardly till they lie under hold-down rails 31 which hold the gizzard flat with the inside surface exposed upwardly. While held in this position, jets of water from nozzles 34 impinge on the contents of the gizzard and wash the gizzard clean. The streams of water from nozzles 34 are under considerable pressure to provide adequate force to dislodge the contents of the gizzard which then fall into trough 60 and thence flow out of the machine with the waste water.

It will be remembered that finger 18 operated to assume that each gizzard was securely impaled so as to be firmly held during the subsequent manipulation of the machine. It will be appreciated then that positive means are required to remove the gizzards from the machine. As the chain 14 commences to follow around sprocket 16 at the discharge of the machine, the links 14′ and 14″ in advance of spears 17 fall away from the spear so the gizzard is unclamped. Over the machine at this point there are provided kick-off wheels 42 with flexible spokes or fingers 43. These fingers straddle spears 17. The kick-off wheel rotates counter-clockwise in Fig. 1, at a considerably higher speed than does sprocket 16, so each gizzard will be subjected to a plurality of blows to drive it off of its impaling spear 17. Any convenient receptacle or conveyor (not shown) may be placed in position to receive gizzards discharged from the machine.

It will be apparent to those skilled in the art that various changes and modifications can be made in the machine described above, without departing from the scope of my invention as set forth in the appended claims.

I claim:

1. A gizzard cleaning machine comprising a chute for feeding gizzards one at a time, a conveyor means communicating with said chute comprising a chain, a plurality of spear means each mounted on a link of said chain at intervals along said chain, each of said spear means comprising a curved sharp pointed prong extending forwardly from the leading end of a link of the chain to which it is secured, knife means substantially centered in relation to said conveyor, spreading and hold-down means aligned with said knife means, cleaning means in the line of travel of said chain at said spreading means to remove the contents of a gizzard while it is under said hold-down means, and means in the path of travel of said chain following said cleaning means to force the cleaned gizzards off of said spear means.

2. A gizzard cleaning machine comprising a conveyor means moving along a predetermined path, a chute positioned adjacent the path of said conveyor means, gizzard gripping elements mounted on said conveyor and responsive to the movement of said conveyor means in the path adjacent said chute to move into an engaging position to engage and then hold gizzards feeding thereto through said chute.

3. The structure defined in claim 2 including a knife adjacent the path of travel of said conveyor means to cut said gizzards after the same are engaged by said gripping elements, spreading and holding means adjacent the path of travel of said conveyor means to spread and hold said gizzards after the same have been cut, water jet means arranged above the path of travel of said conveyor means to wash said gizzards as the same are held down, and water collection means arranged below the path of travel of said conveyor means to collect the water after the same is sprayed on said gizzards.

References Cited in the file of this patent

UNITED STATES PATENTS

| | | |
|---|---|---|
| 2,275,959 | F. Hamachek, Jr. | Mar. 10, 1942 |
| 2,409,463 | Ahrndt | Oct. 15, 1946 |
| 2,663,899 | Biddinger et al. | Dec. 29, 1953 |
| 2,695,418 | Patterson et al. | Nov. 30, 1954 |